United States Patent
Targosz

(10) Patent No.: US 6,379,555 B1
(45) Date of Patent: Apr. 30, 2002

(54) WASTEWATER TREATMENT PROCESS USING AN ADMIXED PASTE OF ACTIVATED CARBON AND MAGNESIUM HYDROXIDE

(76) Inventor: Eugene F. Targosz, 2241 S. 15th Pl., Phoenix, AZ (US) 85034

( * ) Notice: Subject to any disclaimer, the term of this patent is extended or adjusted under 35 U.S.C. 154(b) by 0 days.

(21) Appl. No.: 09/633,641

(22) Filed: Aug. 7, 2000

(51) Int. Cl.$^7$ .............. C02F 1/28; C02F 1/56; C02F 1/66
(52) U.S. Cl. ........ 210/663; 210/665; 210/666; 210/724; 210/726; 210/727; 210/734; 210/735
(58) Field of Search .............. 210/663, 665–667, 210/723, 724, 726–729, 732–735, 738, 739, 749, 753, 754, 787

(56) References Cited

U.S. PATENT DOCUMENTS

| | | | |
|---|---|---|---|
| 2,428,418 A | * | 10/1947 | Goetz et al. |
| 4,094,779 A | * | 6/1978 | Behrman |
| 4,569,768 A | * | 2/1986 | McKinley |
| 4,675,114 A | * | 6/1987 | Zagyvai et al. |
| 5,039,424 A | * | 8/1991 | Mitarai et al. |
| 5,051,189 A | * | 9/1991 | Farrah |
| 5,066,306 A | * | 11/1991 | Clements |
| 5,330,658 A | * | 7/1994 | Grant et al. |
| 5,350,522 A | * | 9/1994 | Fyson |
| 5,354,458 A | * | 10/1994 | Wang et al. |
| 5,510,037 A | * | 4/1996 | Testayre |
| 5,514,192 A | * | 5/1996 | Grigsby, Jr. |
| 5,958,082 A | * | 9/1999 | Lund et al. |
| 6,203,711 B1 | | 3/2001 | Moffett |

* cited by examiner

*Primary Examiner*—David A. Simmons
*Assistant Examiner*—Fred Prince

(57) ABSTRACT

Wastewater treatment processes and preferred systems for practice of the processes, the invention particularly intends the removal of particulates and dissolved materials contaminating the effluent of garment stonewashing, acid washing and similar processes including chlorinated processes, thereby to allow reuse or sewer discharge of water used in such commercial processes. The processes of the invention typically involve initial filtration to remove solid particulates such as pumice, sand, glass beads and the like followed by acidification of the wastewater and contact with a magnesium hydroxide/activated carbon bed, the activated carbon removing organics such as dyestuffs and the like while the magnesium hydroxide precipitates other dissolved materials for subsequent mechanical removal. After treatment with magnesium hydroxide, parcipitating compounds such as iron sulfate and/or ferric chloride are added to precipitate other inorganic substances and dissolved materials. Flocculating agents are then added for further clarification purposes. Material removal then occurs by mechanical extraction including filtration, settling and the like. Chlorine is preferably effectively removed from the system during chemical treatment through initial acidification, thereby to reduce the potential for formation of highly soluble chloride salts which would then be more difficult to remove. The present processes are preferably continuous processes and are effected through the use of preferred systems including filtration, chemical treatment and settling sub-systems.

9 Claims, 4 Drawing Sheets

WASTEWATER TREATMENT PROCESS USING AN ADMIXED PASTE OF ACTIVATED CARBON AND MAGNESIUM HYDROXIDE

FIELD OF THE INVENTION

The invention relates generally to wastewater treatment and particularly to treatment of effluent containing dyestuffs and other organics, inorganics, particulates and dissolved materials exiting a garment stonewashing or similar process.

DESCRIPTION OF THE PRIOR ART

Treatment of wastewater effluent from industrial processing has long been the subject of technical inquiry and practical application due not only to the continuing need for clean water but also due to the cost of using water in process water makeup situations and particularly those situations requiring clean water for process makeup. While the present methodology can extend to water reclamation and recycling in a number of industries including food processing, electronics manufacturing, metals plating, pulp and paper, etc., the present methodology is particularly useful for reclaiming and recycling water from the effluent of textile and dye plants and particularly in the processing of stonewashed and/or sandblasted garments wherein detergents, enzymes, fibers, surfactants, silicates, etc., must be removed from processing effluent with the treated water being sufficiently clean to allow recycle. Expensive water dumping fees are thus avoided by the ability to reuse process water according to the invention. In the treatment of garments and similar items by stonewashing and the like, large amounts of water are necessary to form the process medium in which cotton "bluejeans" and garments formed of blends including polyester/cotton blends, rayon/cotton blends, etc. are treated. In typical stonewashing processes, an abrasive such as pumice is used in combination with detergents, bleach and enzymes to alter the color and texture of garments, these garments being processed in industrial washing machines with the treating materials which can further include dyestuffs, treatment periods varying from minutes to hours. A common practice in the prior art has been to simply discharge the effluent from such processing directly into city wastewater systems. The continuing rise in the cost of water for initial process water makeup and the institution of sewer discharge fees causes prior art discharge practices to become prohibitively expensive. The need to recycle water from processing effluent has therefore become quite apparent to the garment processing industry as well as industry in general.

Examples of prior art teachings intended particularly for removal of dye materials from wastewater effluents are provided inter alia by Weber in U.S. Pat. No. 5,360,551, this patent removing color from dye wastewater through acidification and subsequent use of a cationic flocculent. An optional step in the Weber process is the addition of a reducing agent to produce a desired oxidation-reduction potential, the reducing agent being an alkali metal hydrosulfite, an alkaline earth hydrosulfite, mixtures thereof or combinations of an alkali metal bisulfite, an alkaline earth bisulfite, an alkali metal borohydride and mixtures thereof. In U.S. Pat. No. 5,611,934, Shepperd et al remove dye from process water effluent through treatment of the effluent with a reducing agent, adjustment of pH, treatment with a charged neutralization mixture and flocculation after a second pH adjustment. The particular charge neutralization mixture includes an aluminum salt and a cationic polymer consisting of a copolymer of acrylamide with a cationic monomer such as methacryloylethyltrimethylammonium halide and further including organic wherein the mixture exhibits a Zeta potential of 15 millivolts. Flocculation agents according to Shepperd et al include anionic polymers such as acrylic acid/acrylamide copolymers and non-ionic polymers such as polyacrylamides. Further teachings of wastewater treatments for removal of organics include U.S. Pat. Nos. 5,529,696 to Tibbits; 5,529,697 to Braasch; 5,529,698 to Timmons and 5,529,699 to Kuole, the Kuole patent particularly describing flocculating agents used in wastewater treatment processing. Grant et al, in U.S. Pat. No. 5,330,658, utilize precipitation and flocculation techniques to remove contaminents from wastewaters and particularly disclose an acidification step for removal of oxidizing agents.

Wastewater treatment according to the invention is particularly intended to remove color, to lower levels of TBS, TSS, BOD and COD in order to allow recycle of process water with resulting savings in makeup and disposal costs. The processes of the invention are particularly suited to treatment of waste-water effluent issuing from garment stonewashing and similar treatment processes. In such processing, wastewater effluent containing detergents, enzymes, fibers, surfactants, silicates, dyestuffs and particulates are treated to allow reclamation of greater than 95% of water originally used for process water makeup. The present processes remove all cotton lint, synthetic fibers, dissolved silica and solid particulates from effluent and further remove bleach, coloring from dyes either added during garment processing or removed from garments by processing, such coloring typically being black, green, red, blue and the like. The present methodology also allows removal of large quantities of soluble surfactants while lowering BOD, DOD, TSS and TBS levels. Suspended fibers, solids and colored materials are further removed in order to render a treated effluent reusable for process water makeup, reuse being possible many times over before a need exists to discharge major amounts of water originally used for makeup purposes. The present methodology can be practiced inexpensively, the physical system necessary for practice of the methodology also being inexpensive to fabricate and operate.

SUMMARY OF THE INVENTION

The invention provides methodology and system architecture intended for treatment of wastewater emanating from industrial processes particularly including garment washing processes which can involve removal from a garment of at least a portion of a dyestuff originally applied to the garment. The invention particularly intends the treatment of wastewater effluent from a garment stonewashing process such as the stone-washing of "jeans" which can include the removal of dyestuffs from the garment and/or the replacement of dye or color to the garment, the processes of the invention being intended to remove dyestuffs and other organic materials, lint, fibers, silicates and particulate solids inter alia from a stonewashing wastewater effluent in order to render the wastewater or effluent reusable in a stonewashing process or the like. A particular intent of the invention is the removal of materials from the wastewater effluent,which materials were employed for treatment of garments in the process producing the wastewater effluent, such materials including detergents, enzymes, surfactants, silicates and abrasive particulates such as pumice and the like. Processing according to the invention lowers levels of TSS, TDS, BOD and DOD so that water is reclaimed for process water makeup and/or discharge.

In a preferred embodiment of the invention involving the treatment of a wastewater effluent from a "jeans" stonewashing process, the wastewater effluent can optionally be filtered prior to subsequent chemical treatment. Since the present processes envision continuous flow treatment of effluent of only a few gallons and up to millions of gallons daily, initial filtration may be waived as long as any particulate material which might be removed by initial filtration is not converted to a dissolved material by subsequent chemical treatment whereby said nearly dissolved material would be difficult to remove by such subsequent chemical treatment. Initial filtration can be effected by passage of the wastewater effluent through a shaker with a mesh size of from 5 to 120 microns to remove large bits of pumice or similar abrasive and any other contaminants which are large enough to be trapped by filtration.

Preferred processes according to the invention include the step of acidification subsequent to optional initial filtration, it being the intent to produce a pH in the effluent of between 2 and 6. Sulfuric acid is the preferred acidifying agent. The acidification step liberates chlorine which may be present in the system in order to prevent the formation of chloride salts which would be more soluble than salts intended to be formed during subsequent chemical treatment. Chemical treatment after the acidification step involves formation of relatively insoluble salts in order to facilitate removal of dissolved materials from the wastewater effluent. It is desirable according to the invention to reduce the presence of salts containing chlorine which can interfere with subsequent clarification steps. Caustic soda is also used for pH control and/or adjustment after the acidification step.

A temperature of approximately 40° F. to 140° F. should be maintained in the wastewater effluent in order for chemical treatment to proceed at a reasonable rate. Preferred temperatures are between 60° F. and 80° F. Higher temperatures can adversely affect solubilization and can cause the formation of complexes or flocculation within the wastewater effluent.

The acidified wastewater effluents further treated according to the invention by passage of the effluent in contact with a treatment paste primarily formed of magnesium hydroxide and activated carbon. Activated carbon or activated charcoal is used for removal of color and organics from the effluent as well as other organic compounds which may be present in the effluent. Magnesium hydroxide is present in order to form insoluble magnesium salts as the wastewater effluent flows in and around the paste formed of the magnesium hydroxide and activated carbon. A portion of the paste can be cycled to a subsequent settling tank for further reaction with the waste-water effluent.

The insoluble magnesium salts can be removed by settling or filtration prior to introduction of an iron sulfate either singly or in combination with carbonates, lime, alum, ferric chloride, ferric sulfate and sodium aluminate, these materials being used to precipitate other ionic materials from the solubilized state, which other ionic materials were not removed by the magnesium treatment.

Flocculation through use of an ionic flocculent such as a highly water soluble polyacrylonitrile polymer can then take place. A polyacrylamide can be used to cause flocculation of materials which have not been absorbed by the activated carbon or precipitated by the precipitating agents previously added to the wastewater effluent. Depending upon the type of effluent to be treated, flocculents such as amines, polyacrylamides, ammonium chlorides or polydimethylammonium chlorides can be used as flocculating agents.

Settling can be employed for removal of precipitated materials and flocculated materials with filtration being employed as necessary. The resulting high purity water can be recycled to a stonewashing process or other wastewater effluent-producing process or can be discharged as a system effluent which meets applicable environmental regulations. The same water can be treated up to thirty times by the present processing prior to a need for discharge.

System architecture can include shaker filtration apparatus capable of the initial filtration step described above. Filtration can be accomplished through the use of filter press apparatus utilizing diatomaceous earth. Further, bag filters can also be employed as well as other filtration apparatus known in the art. Tanks used for acidification as well as other chemical treatment including clarification can be tanks having conical lower portions which facilitate precipitate removal or settling. The physical system of the invention can be automated to include pH monitoring and control as well as control of all plumbing including pumps and the like which involve charging of treating materials into the wastewater effluent.

While the present methodology is described herein primarily in reference to treatment of a wastewater effluent from a jeans or garment stonewashing process, it is to be understood that the present methodology can be employed in food processing, particularly beef slaughterhouse waste processing, pulp and paper processing, railcar and locomotive washing, metals and plating, mining, semiconductor and electronics manufacturing and other textile and dye applications.

Accordingly, it is a primary object of the invention to provide wastewater treatment processes and preferred systems for practice of the processes which are intended to remove particulates and dissolved materials contaminating such effluents in industrial applications including garment stonewashing, beef processing, electronics manufacturing and the like.

It is another object of the invention to provide wastewater treatment processes and preferred systems for practice of the processes which are particularly intended to remove particulates, dyestuffs and dissolved materials as well as organics from garment stonewashing and similar processes to allow continuing recycle of relatively pure water from the wastewater effluent for new process water makeup.

It is a further object of the invention to provide wastewater treatment process and apparatus wherein at least one precipitating agent formed into a paste with an absorbent such as activated carbon or charcoal is caused to contact waste-water effluent in order to remove the contaminants from solution and place said contaminants into a form readily removed by physical removal processes.

Further objects and advantages of the invention will become more readily apparent in light of the following detailed description of the preferred embodiments.

DESCRIPTION OF THE PREFERRED EMBODIMENTS

Figure 1:
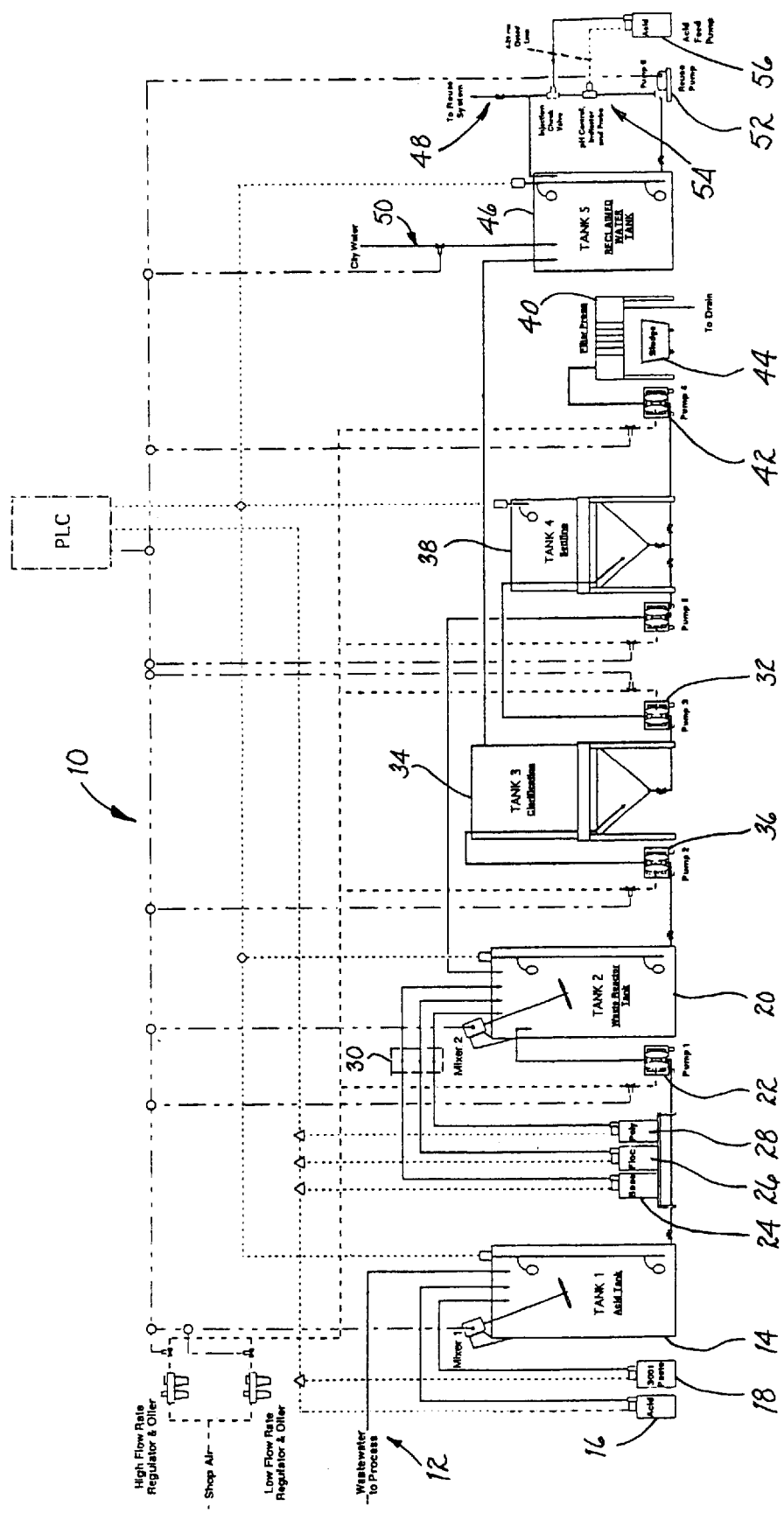
FIG. 1 is a diagrammatic representation of a high volume wastewater treatment system which would find utility in effecting the particular wastewater effluent treatment processes of the invention.

Referring to the drawings and particularly to FIG. 1, a wastewater recovery system is seen generally at 10 to comprise one particular system architecture which can be utilized according to the invention to practice the several methods of the invention. Wastewater effluent is seen at 12 to enter the system 10, this effluent being from an industrial process of a type such as described herein. As noted herein, the present methodology and apparatus are particularly useful in the treatment of a wastewater effluent from a garment stonewashing process, such effluent typically including abrasives such as pumice, bleach, detergents and enzymes as well as lint, fibers, dissolved silicates, particulate solids and organics including dyestuffs removed from the garment during stonewashing or added during the stonewashing process in order to effect a desired appearance of the processed garments. Wastewater effluents from garment washing processes such as stonewashing processes also typically include soluble surfactants.

Although not seen in FIG. 1, the wastewater effluent can be filtered or subjected to other physical separation processes for removal of particulates including large pieces of pumice. Conventional separatory processes include shaker filtration and the like with mesh sizes of approximately 100 to 120 microns being preferred. The filtration step is optional and the waste-water effluent can be directed into tank 14 without being subjected to a filtration or other separatory process. The waste-water within the tank 14 is first acidifed from an acid storage unit 16 to cause the pH of the wastewater to exist in the tank 14 at a pH of between 2 and 6.5 with a preferred range of 2.5 to 4.5. A preferred acid for acidification purposes is sulfuric acid, 66° Baume typically having an activity of 93%. The acid is charged into the tank 14 from the storage unit 16 by known automated control systems.

A paste is also discharged into the tank 14 from paste storage unit 18, the paste being formed of magnesium hydroxide and activated carbon or activated charcoal with minor amounts of sodium hydroxide and sufficient water to maintain a fluidity of the paste material. The paste is preferably mixed within the storage unit 18 by addition of the magnesium hydroxide in the form of a material known as MAG-50, a commercially available material. Approximately 600 pounds of the MAG-50 is admixed with approximately 100 pounds of activated carbon. Magnesium hydroxide in the paste is taken to be at least 30% by weight while activated carbon within the paste is taken to be at least 10% by weight. Magnesium hydroxide is typically present in the paste in a range of 80% to 90% by weight with activated carbon being present in a range of 10% to 20% by weight. A preferred range of magnesium hydroxide is 85% to 90% by weight. Approximately one-half percent of sodium hydroxide may be present in the paste, sodium hydroxide being preferably eliminated from the paste when wastewater being treated contains chlorine bleach.

The wastewater contacts the magnesium hydroxide/ activated carbon paste within the interior of the tank 14 preferably in a continuous flow process, the flow rate of the system of FIG. 1 preferably being between 30 to 175 gallons of effluent per minute. Approximately 60 to 150 pounds of paste is required per 100,000 gallons of effluent. A preferred quantity of paste is between 80 to 100 pounds per 100,000 gallons of effluent. The activated carbon or charcoal in the paste removes coloring agents and organics from the wastewater in a manner as is known in the art. Magnesium hydroxide in the paste acts to form insoluble magnesium salts and therefore precipitates dissolved materials from the wastewater.

The wastewater is then pumped from the tank 14 to tank 20 by means of a suitable pump 22, the wastewater entraining in its flow the insoluble salts produced in the tank 14 as well as colloidal materials. In the tank 20, precipitating agents such as iron sulfate or ferric chloride either singly or combined with carbonates, lime, alum, ferric chloride and sodium aluminate are added to the wastewater in order to precipitate materials not precipitated by the magnesium hydroxide in the tank 14. The precipitating agent is added in a quantity equivalent to 0.05% to 1.0% by weight with 0.1% to 0.25% being preferred by weight of effluent. Adjustment of pH occurs in the tank 20 through the addition of sodium hydroxide, the pH being adjusted to a range of 6.5 to 12.5 and preferably 7.0 to 10.0.

An organic polymeric flocculating agent is also charged into the interior of the tank 20, this agent preferably being an anionic flocculant such as water soluble polyacrylonitrile polymer. A polyacrylamide, specifically a Novafloc PHA anionic, can be added at a level of 0.00005% to 0.02% based on weight of the effluent wastewater to cause flocculation of materials which have not either been absorbed by the activated carbon or precipitated by the ferric or ferrous based compounds or magnesium hydroxide previously added. A preferred range is 0.001% to 0.01% by weight of effluent. The precipitating agent and respective flocculating agents are preferably added from storage units 24, 26 and 28 respectively such as by automated control apparatus generally seen at 30. The control apparatus in a conventional embodiment is capable of controlling wastewater flow and material flow throughout the system 10.

The treated contents of the tank 20 is moved to clarification tank 34 by means of pump 36. In the clarification tank 34, clarification takes place in order to remove haze from the wastewater effluent through settling of precipitated materials and extraction of same in later stages through filtration or other separatory processes. The treated aqueous contents of the clarification tank 34 is preferably moved via pump 32 to settling tank 38 to further remove precipitated solids and the like. At least a portion of the contents of the settling tank 38 can be recycled from the tank 38 to a process water makeup location (not shown) where water is stored for use in an industrial process which produces the wastewater effluent treated according to the invention. Paste can be cycled into the tank 38 in order to provide additional reaction time between the paste and the wastewater effluent. Settled materials removed from the tank 38 are preferably taken to a filter press 40 by means of a pump 42, the filter press typically using diatomaceous earth as a filter medium to produce sludge at 44 which is removed from the system 10 and discarded as solid waste. Alternatively, the solids in the tank 38 can be recycled to the tank 20.

Reclaimed water in tank 46 can be recycled or discharged as desired respectively through plumbing at 48 and 50 respectively, the reclaimed water being moved by pump 52. Control of pH of the reclaimed water is effected at 54 by means of appropriate pH control equipment and chemical agents contained in storage unit 56.

Approximately 95% of the treated water within the clarification tank 34 is taken directly to the reclaimed water tank 46, the water being sufficiently pure at this point to recycle the water or discharge the water. Purified water from the settling tank 38 is typically recycled to a process water makeup location (not shown) or recycled to the tank 20 by means of pump 58.

Particular note is taken of the paste forming the magnesium hydroxide/activated carbon mixture involved in the wastewater effluent treatment in the tank 14. The magnesium hdyroxide/activated carbon mixture preferably exists in the tank 14 in the form of a bed having a higher specific gravity than the wastewater effluent which is introduced into the tank 14. Accordingly, the bed of magnesium hydroxide/activated carbon lies at the bottom of the tank 14 with the wastewater effluent flowing therethrough and into contact therewith over surfaces of the bed of material. During this treatment, both magnesium hydroxide and carbon are being sacrificed in order to clarify and precipitate materials from the wastewater effluent.

Figure 2:
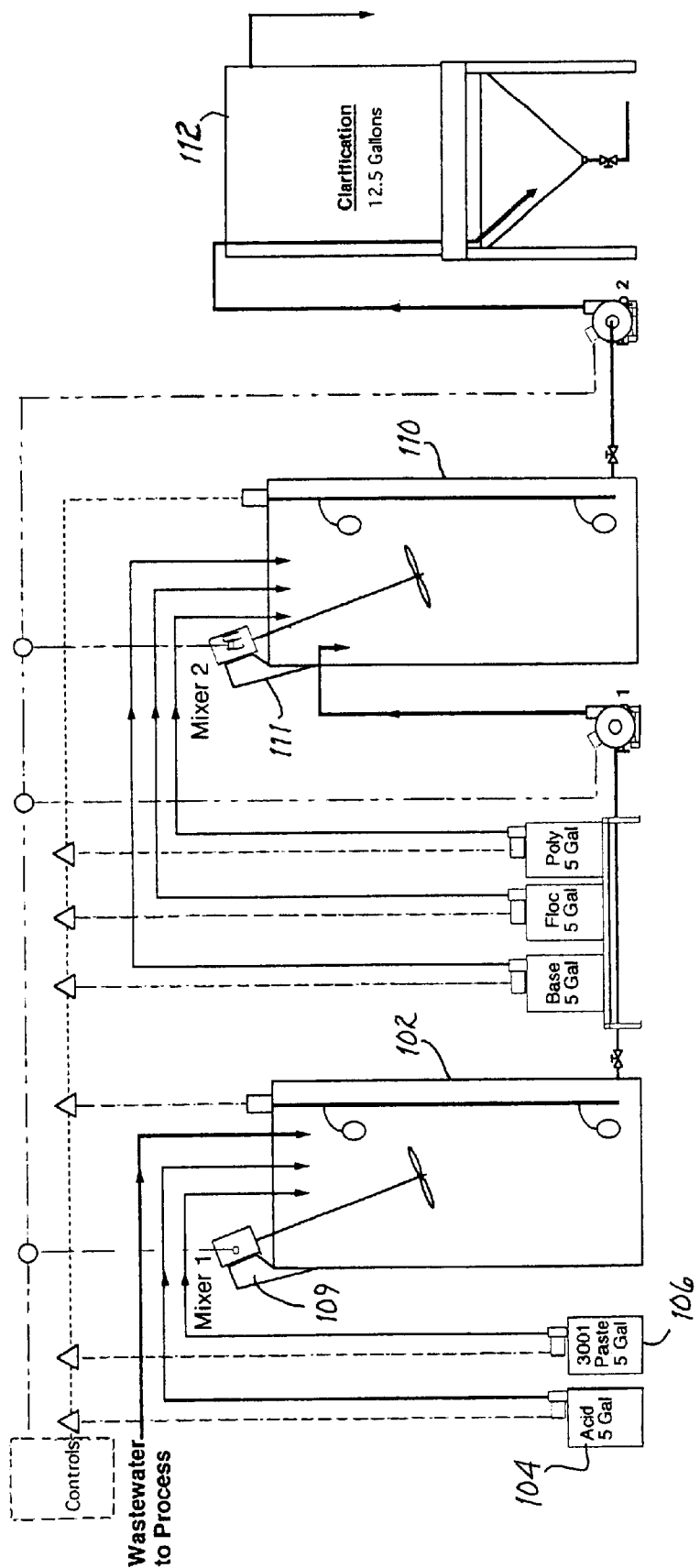
FIG. 2 is an enlarged diagrammatical representation of system components used for acidification, reaction and clarification in a relatively small continuous processing system.

Referring now to FIG. 2, a low flow rate systems such as could be utilized in a small laundry operation is seen to be substantially identical to certain portions of the system of FIG. 1 with exceptions as to tank sizes and the like In the system shown in FIG. 2, wastewater is charged into tank 102 either with or without filtration, screening or the like, tank 102 having a capacity of approximately 15 gallons as an example. The wastewater within the tank 102 is acidified from an acid supply 104 to a pH such as has been previously indicated relative to FIG. 1. The paste described previously is supplied into the tank 102 by means of a paste supply 106, the supply of acid from the supply 104 and the supply of paste from the supply 106 can be automatically accomplished by means of conventional controls.

Using these controls 108, acidified wastewater is pumped into tank 110 for reaction therein. Paste from a settling tank (not shown in this system 100) is added to the tank 110 along with a precipitating agent and polymer flocculent as described above relative to FIG. 1. The pH is adjusted within the tank 110 by addition of sodium hydroxide in a manner as described relative to FIG. 1. In both tanks 102 and 110, mixers 109 and 111 respectively cause circulation within said tank.

Water from the tank 110 is pumped into clarification tank 112 for clarification purposes and eventual processing as has been described relative to FIG. 1. The system 100 of FIG. 2 illustrates a simplified system which can take the form of a system small enough to fit within the confines of a small laundry operation.

Figure 3:
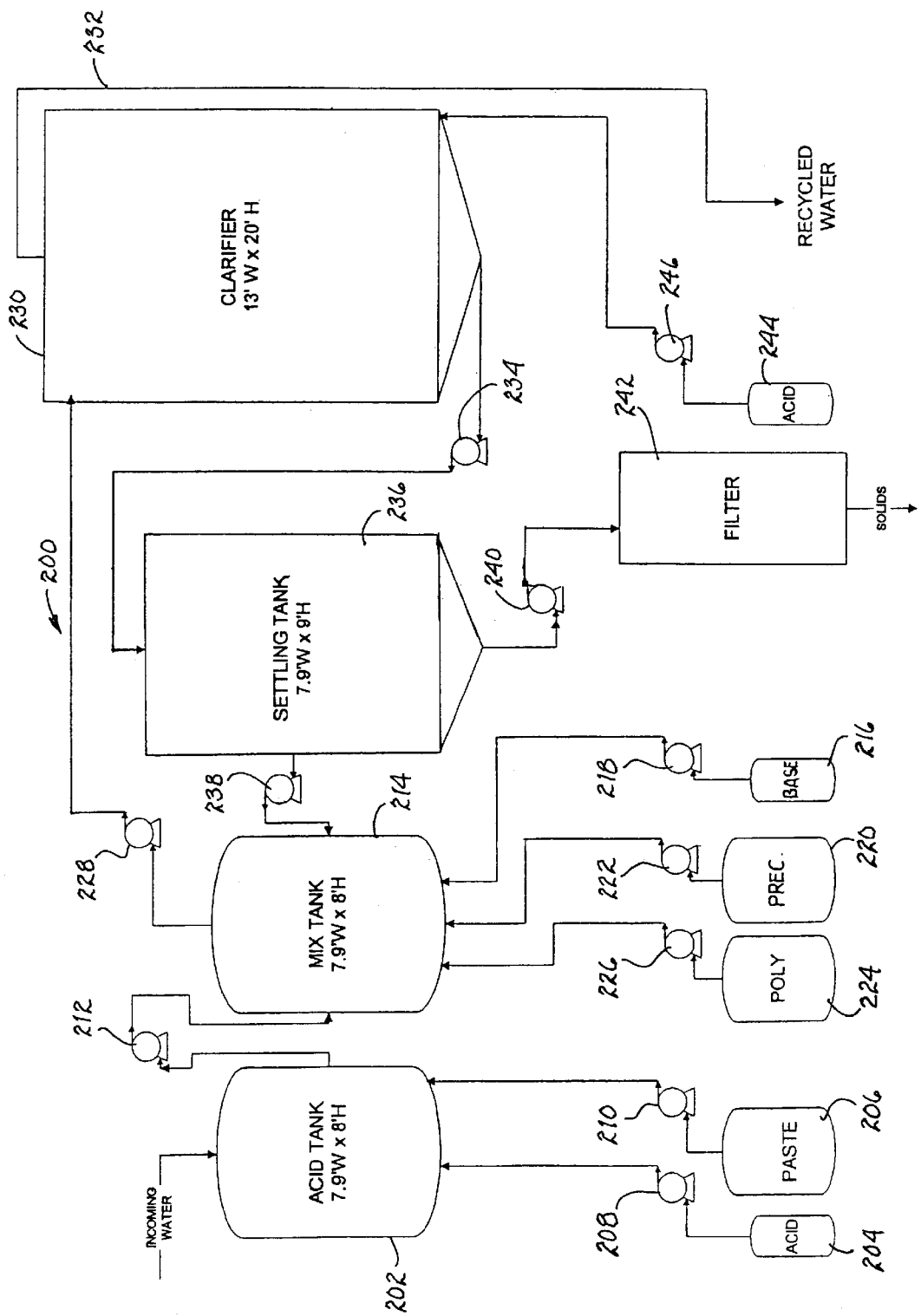
FIG. 3 is a simplified diagrammatical representation of a continuous flow processing system configured according to the invention; and, FIG. 4 is a schematic illustrating a "floor plan" of a system configured according to the invention.

Referring now to FIG. 3, a simplified representation of a wastewater recovery system 200 is seen to have the capability of a flow rate of at least 200 gallons per minute. In the system 200, incoming water which is to be treated is charged into acid tank 202 which is supplied with sulfuric acid from acid supply 204 and with the magnesium paste previously described from a paste supply 206, the supplies 204 and 206 being controlled by means of pumps 208 and 210 respectively. A pump 212 moves the acidified and partially reacted wastewater from the tank 202 to a mixing tank 214 where pH adjustment occurs from base supply 216 through pump 218 to adjust pH to that range previously indicated. A precipitating agent is supplied from supply 220 into the tank 214 through pump 222, this precipitating agent being iron sulfate, ferric chloride or the like as described hereinabove. A poly supply 224 supplies a flocculating agent to the tank 214 by means of the pump 226.

Pump 228 removes reacted wastewater to clarifier 230 from which recycle water is withdrawn at 232. Clarification takes place within the tank 230 in a manner essentially identical to that described relative to FIG. 1. As such, material from the clarifier 230 is pumped by pump 234 into settling tank 236 from which paste can be withdrawn and supplied to the tank 214 by means of pump 238. Solids from the settling tank 236 are drawn therefrom by pump 240 and directed to a filter 242 as described relative to FIG. 1. Acid can be supplied into clarifier 230 from acid supply 244 through the impetus of pump 246.

The various sizes of the tanks 202, 214, 236 and 230 are seen in FIG. 3 in order to show the relative dimensions of such a system.

Figure 4:
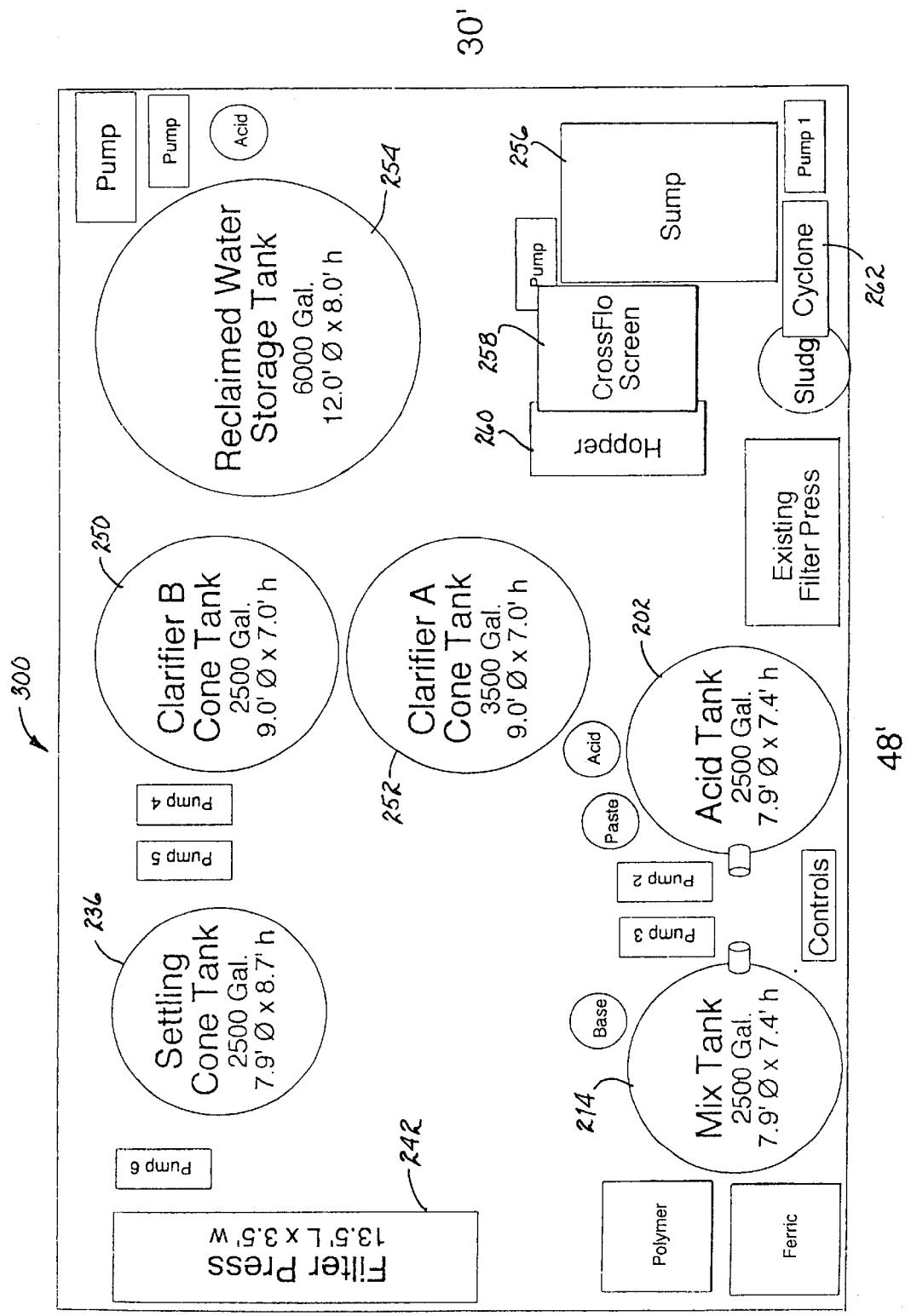

In this regard, FIG. 4 effectively provides a floor plan of a system capable of high process flow such as 140,000 gallons per day within a space substantially 30'×48' in size. FIG. 4 essentially illustrates the relative locations of the various portions of such a system with the function of the clarifier 230 of FIG. 3 taking place in twin clarification tanks 250 and 252 which would often occur due to ceiling height restrictions. System 300 seen in FIG. 4 is marked with numerals corresponding to the system of FIG. 3 for the sake of simplicity and correlation of disclosure. The system 300 of FIG. 4 includes additional system components such as a reclaimed water storage tank 254 as well as a sump 256, crossflow screen 258 and hopper 260 associated with solids removal. A cyclone 262 is also included in the system 300 in association with sludge removal.

Depending upon the capacity of the systems, the present processes intend to be continuous in nature and to process from one thousand to a million gallons per day of wastewater effluent. The capacity of the pump units and the size of the tanks chosen for the present systems allow high efficiency within a low cost treatment system.

Flocculating agents such as amines, polyacrylamides, ammonium chlorides or polydimethylammonium chlorides can also be used as flocculants depending upon the nature of the waste-water effluent. Colloidal and finely divided suspended matter is effectively removed from the wastewater effluent by treatment with the flocculating agents and the precipitating agents disclosed herein. Physical separatory processes including filtration and settling remove precipitated and flocculated materials. Water may thus be reclaimed and reused many times over prior to discharging from the systems. The systems can further include monitoring and control modules such as are shown to support fully automatic operation of the systems.

The invention has thus been shown in a variety of system architectures which include systems capable of relatively low processing flow such as would be used in small laundry situations and in large scale flow processes such as can be employed in the large scale stonewashing of fabrics and the like. The various systems capable of embodying the invention are also seen to comprise varying system components selected in view of necessary system operational parameters including effluent which is to be treated. Accordingly, the scope of the invention is not limited by the particular architecture of any particular system used for practice of the invention. The processes of the invention can also be practiced other than as explicitly described herein with differing system architecture as noted. It is further to be understood that wastewater effluents emanating from differing industrial processes can be treated according to the invention without substantial departure from the process explicitly described hereinabove for the treatment of wastewater emanating from a garment washing or stonewashing process, the system architecture, process and other characteristics of the invention being defined by the scope of the appended claims.

What is claimed is:

1. A wastewater treatment process for treatment of an effluent from an industrial process for recovery or discharge of relatively pure water, comprising the steps of:

controlling the pH of the effluent;

contacting the effluent with a mixture of magnesium hydroxide and activated carbon to form insoluble magnesium salts and to absorb contaminated materials, the magnesium hydroxide and the activated carbon being admixed into a paste existing as a bed having surface area contact with the effluent;

treating the effluent with a precipitating agent to form insoluble salts;

treating the effluent with a flocculating agent to remove colloidal and finely divided solids; and, separating relatively pure water from precipitated materials and treatment materials to reclaim the water or discharge the water from the process.

2. The process of claim 1 wherein the effluent is from a garment stonewashing process.

3. The process of claim 2 and further comprising the step of filtering the effluent prior to controlling the pH thereof.

4. The process of claim 2 wherein the step of controlling the pH of the effluent comprises addition of an acid to cause the pH to be in a range between 2 and 7.

5. The process of claim 4 wherein the acid comprises sulfuric acid.

6. The process of claim 1 wherein the precipitating agent is selected from the group consisting of ferric sulfate, ferric chloride and sodium aluminate.

7. The process of claim 1 wherein the flocculating agent comprises polyacrylonitrile polymer.

8. The process of claim 1 wherein the flocculating agent comprises a polyacrylamide.

9. The process of claim 1 wherein the flocculating agent is selected from the group consisting of amines, polyacrylamides, ammonium chlorides and polydimethylammonium chloride.

* * * * *